(12) United States Patent
Chi

(10) Patent No.: US 9,985,960 B2
(45) Date of Patent: May 29, 2018

(54) METHOD FOR PROTECTING DATA ON A MASS STORAGE DEVICE AND A DEVICE FOR THE SAME

(71) Applicant: GEMALTO S.A., Meudon (FR)

(72) Inventor: Zhaolin Chi, Meudon (FR)

(73) Assignee: GEMALTO SA, Meudon (FR)

( * ) Notice: Subject to any disclaimer, the term of this patent is extended or adjusted under 35 U.S.C. 154(b) by 0 days. days.

(21) Appl. No.: 14/403,327

(22) PCT Filed: May 21, 2013

(86) PCT No.: PCT/EP2013/060413
§ 371 (c)(1),
(2) Date: Nov. 24, 2014

(87) PCT Pub. No.: WO2013/174813
PCT Pub. Date: Nov. 28, 2013

(65) Prior Publication Data
US 2015/0156195 A1 Jun. 4, 2015

(30) Foreign Application Priority Data
May 23, 2012 (WO) ................ PCT/CN2012/075943

(51) Int. Cl.
*H04L 29/06* (2006.01)
*G06F 21/42* (2013.01)
(Continued)

(52) U.S. Cl.
CPC .......... *H04L 63/0838* (2013.01); *G06F 21/42* (2013.01); *G06F 21/6218* (2013.01); *G06F 21/78* (2013.01)

(58) Field of Classification Search
CPC ....... H04L 63/0838; H06F 21/42; H06F 21/78
See application file for complete search history.

(56) References Cited

U.S. PATENT DOCUMENTS

| 5,623,637 A * | 4/1997 | Jones | G06F 12/1466 710/13 |
| 7,519,989 B2 * | 4/2009 | Lin | G06F 21/34 713/172 |

(Continued)

FOREIGN PATENT DOCUMENTS

| EP | 1075161 A2 | 2/2001 |
| EP | 1684182 A1 | 7/2006 |

OTHER PUBLICATIONS

PCT/EP2013/060413, International Search Report, dated Jul. 25, 2013, European Patent Office, P.B. 5818 Patentlaan 2 NL-2280 HV Rijswijk.

*Primary Examiner* — Sharon Lynch
(74) *Attorney, Agent, or Firm* — The Jansson Firm; Pehr B. Jansson

(57) ABSTRACT

A method for protecting data on a mass storage device. The device has a security module and a data storage area configured to be switched between a protected state, in which accessing the data storage area is forbidden and an unprotected state, in which accessing the data storage area is authorized. Switching the data storage area from the protected state to the unprotected state by sending a request to a remote server, receiving a one-time password on a communication device, in response to the sent request, providing the received one-time password to the security module, authorizing access to the data storage area by the security module, once the provided one-time password is deemed valid by the security module.

13 Claims, 1 Drawing Sheet

(51) Int. Cl.
*G06F 21/62* (2013.01)
*G06F 21/78* (2013.01)

(56) References Cited

U.S. PATENT DOCUMENTS

| | | | | |
|---|---|---|---|---|
| 7,571,489 B2* | 8/2009 | Ong | G06F 21/34 | 726/29 |
| 8,661,254 B1* | 2/2014 | Sama | H04L 9/3215 | 380/247 |
| 8,745,401 B1* | 6/2014 | Hintz | H04L 9/3226 | 713/158 |
| 8,752,146 B1* | 6/2014 | van Dijk | H04L 63/0861 | 340/5.52 |
| 8,826,377 B2* | 9/2014 | Lou | G06F 21/31 | 380/277 |
| 8,850,218 B2* | 9/2014 | Hird | G06F 21/34 | 713/159 |
| 2002/0194499 A1* | 12/2002 | Audebert | H04L 63/0853 | 726/35 |
| 2003/0212894 A1* | 11/2003 | Buck | G06F 21/34 | 713/184 |
| 2005/0138421 A1* | 6/2005 | Fedronic | G06F 21/32 | 726/4 |
| 2006/0041759 A1* | 2/2006 | Kaliski, Jr. | G06F 21/31 | 713/184 |
| 2006/0262928 A1* | 11/2006 | Bar-El | G06F 21/78 | 380/228 |
| 2007/0005963 A1* | 1/2007 | Eldar | G06F 21/6209 | 713/168 |
| 2007/0011724 A1* | 1/2007 | Gonzalez | G06F 21/31 | 726/4 |
| 2007/0016941 A1* | 1/2007 | Gonzalez | G06F 21/31 | 726/9 |
| 2007/0061566 A1* | 3/2007 | Bailey | H04L 9/0866 | 713/151 |
| 2007/0113294 A1* | 5/2007 | Field | H04L 63/083 | 726/27 |
| 2007/0234064 A1* | 10/2007 | Nihei | G06F 21/34 | 713/183 |
| 2008/0010453 A1* | 1/2008 | Hamid | G06F 21/31 | 713/159 |
| 2008/0059798 A1* | 3/2008 | Fedronic | G07C 9/00103 | 713/172 |
| 2008/0065892 A1* | 3/2008 | Bailey | H04L 63/0492 | 713/171 |
| 2008/0072060 A1* | 3/2008 | Cannon | G06F 21/34 | 713/185 |
| 2008/0114990 A1* | 5/2008 | Hilbert | G06F 21/78 | 713/189 |
| 2008/0276098 A1* | 11/2008 | Florencio | G06F 21/46 | 713/183 |
| 2008/0301460 A1* | 12/2008 | Miller | H04L 63/0815 | 713/183 |
| 2009/0125997 A1* | 5/2009 | Cook | G06F 21/34 | 726/6 |
| 2009/0307767 A1* | 12/2009 | Semba | G06F 21/34 | 726/18 |
| 2009/0327634 A1* | 12/2009 | Bovee | G06F 21/78 | 711/163 |
| 2009/0328168 A1* | 12/2009 | Lee | G06F 21/34 | 726/6 |
| 2010/0017809 A1* | 1/2010 | Bryant-Rich | G06F 9/4411 | 719/327 |
| 2010/0037323 A1* | 2/2010 | Lemieux | G06F 21/57 | 726/26 |
| 2010/0042847 A1* | 2/2010 | Jung | G06F 21/43 | 713/183 |
| 2010/0050244 A1* | 2/2010 | Tarkhanyan | G06F 21/57 | 726/7 |
| 2010/0199108 A1* | 8/2010 | Abzarian | G06F 21/805 | 713/193 |
| 2011/0213941 A1* | 9/2011 | Chou | G06F 21/10 | 711/164 |
| 2011/0302421 A1* | 12/2011 | Harrison | H04L 9/3228 | 713/180 |
| 2012/0297205 A1* | 11/2012 | Yuen | G06F 21/31 | 713/193 |
| 2013/0047223 A1* | 2/2013 | Headley | H04L 63/0838 | 726/5 |
| 2013/0121488 A1* | 5/2013 | Kang | H04L 9/0894 | 380/44 |
| 2013/0145447 A1* | 6/2013 | Maron | G06F 21/31 | 726/6 |
| 2013/0191899 A1* | 7/2013 | Eldefrawy | H04L 9/3228 | 726/6 |
| 2013/0276078 A1* | 10/2013 | Rockwell | G06F 21/34 | 726/7 |
| 2013/0322622 A1* | 12/2013 | Bailey | H04L 63/0492 | 380/44 |
| 2014/0040629 A1* | 2/2014 | Hird | G06F 21/34 | 713/184 |

\* cited by examiner

METHOD FOR PROTECTING DATA ON A MASS STORAGE DEVICE AND A DEVICE FOR THE SAME

BACKGROUND

1. Field of the Invention

The present invention relates to a method for protecting data on a mass storage device. The invention also relates to a password-protected mass storage device.

2. Description of the Related Art

Password-protected mass storage devices allow the secure storage of digital data. In such devices, data can be stored and protected against unauthorized external access. Typically, the device includes a security module, able to selectively restrict or grant access to the stored data. For example, the device is initialized with a pre-set password. Said password must then be provided to the device, before every attempt to access stored data, such as reading or writing data, as a means to ensure authentication. The U.S. patent application US20071112981 describes such a device.

However, this device has several drawbacks. Said password can be cracked by adverse third-parties, thus compromising the security of the device. Furthermore, a user of the device may lose or forget said password, and thus be unable to legitimately access stored data.

Accordingly, it is desirable to provide a method and a device for protecting data on a mass storage device, with an increased level of security.

SUMMARY OF THE INVENTION

It is therefore an object of the present invention to provide a method for protecting data on a mass storage device, said device comprising a security module and a data storage area configured to be switched between a protected state, in which accessing the data storage area is forbidden and an unprotected state, in which accessing the data storage area is authorized, wherein switching said data storage area from the protected state to the unprotected state comprises steps of:
- sending a request to a remote server;
- receiving a one-time password on a communication device, in response to the sent request;
- providing said received one-time password to the security module;
- authorizing access to the data storage area by the security module, once said provided one-time password is deemed valid by said security module.

In another embodiment of the invention, said one-time password is rejected if it is not provided to the security module within a preset amount of time after the request has been emitted.

In another embodiment of the invention, receiving said one-time password includes the reception, on the communication device, of a text message containing said one-time password.

In another embodiment of the invention, receiving said one-time password includes reception, on a pre-set e-mail account, of a message containing said one-time password.

In another embodiment of the invention, the method includes a step of displaying said received one-time password on the communication device.

In a further embodiment of the invention, providing said one-time password includes inputting said one-time password into a user interface connected to the security module.

In another embodiment of the invention, the data storage area is switched to the protected state by means of disk encryption.

The invention also relates to a password-protected mass storage device, comprising a security module and a data storage area, said data storage area being configured to be switched between a protected state, in which accessing the data storage area is forbidden and an unprotected state, in which accessing the data storage area is authorized, wherein said module is programmed to switch said data storage area from the protected state to the unprotected state by executing steps of:
- sending a request to a remote server;
- retrieving a one-time password provided to the security module and received in response to the sent request;
- authorizing access to the data storage area, by the security module, once said provided one-time password is deemed valid by said security module.

In another embodiment of the invention, the security module comprises a chip card.

In another embodiment of the invention, the security module comprises a secure cryptoprocessor.

BRIEF DESCRIPTION OF THE DRAWINGS

The advantage of the present invention will become apparent from the following description of several embodiments with reference to the accompanying drawings, in which.

DETAILED DESCRIPTION

The invention proposes a method for protecting data on a mass storage device and a password-protected mass storage device, using a one-time password authentication scheme.

Using a one-time password instead of a pre-set password increases the level of security of the protection, by limiting the risks of password cracking.

Figure 1:
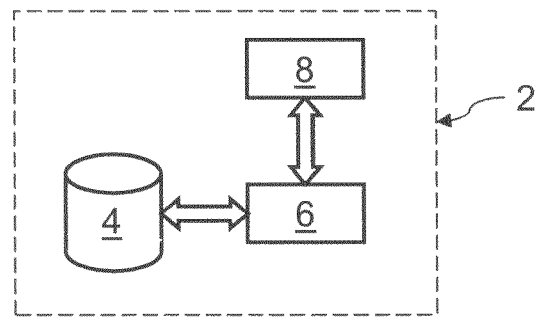
FIG. 1 is a schematic illustration of a password-protected mass-storage device.

FIG. 1 illustrates a password-protected mass-storage device 2. This storage device 2 includes:
- a data storage area 4;
- a security module 6;
- a communication interface 8.

The data storage area 4 is a non-volatile computer data storage system, able to store data and to retrieve stored data. For example, this area 4 is a solid-state semiconductor memory such as Flash memory.

The security module 6 provides secure access to area 4. This module 6 is programmed to switch the data storage area 4 between protected and unprotected states. In the unprotected state, access to the storage area 4 is authorized, for example for performing operations such as writing data to or reading contents of said storage area 4. In the protected state, access to the storage area 4 is forbidden. For example, the module 6 is able to encrypt or decrypt contents of the storage area 4. Here, said module 6 includes a chip card.

The interface 8 allows access to the device 2, for example, for exchanging data and/or commands to and from the storage area 4 and the module 6. For example, the interface 8 includes a Universal Serial Bus (USB) interface (as defined by the USB technical specifications published by the USB Implementers Forum, Inc.).

The password-protection of the device 2 is implemented through an authentication method known as one-time password. Typically, with such a method, an object or a service is password-protected against unauthorized usage. Said object or service may be accessed by legitimate users, with a one-time password (OTP) communicated through a security token. This OTP is a password or passphrase designed to be valid only for a single use. For example, the OTP takes the form of a string of numerical, alphabetical or alphanumerical characters, of arbitrary finite non-zero length.

Here, the password-protection of the device 2 is implemented using an algorithm known as "HMAC-Based One-Time Password Algorithm". An example of this algorithm is described in the Internet Engineering Task Force (IETF) memorandum RFC 4226. This algorithm is based on the Hash-based Message Authentication Code (HMAC) algorithm, described in the IETF memorandum RFC 2104.

Figure 2:
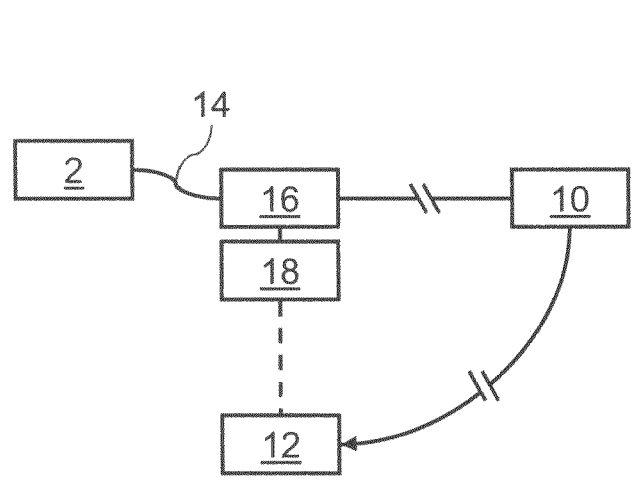
FIG. 2 is a schematic illustration of a system for using the mass-storage device of FIG. 1.

FIG. 2 illustrates an embodiment of a system for using the device 2. This system includes:
- a remote authentication server 10;
- a communication device 12.

The module 6 is programmed to switch the storage area 4 from the protected state to the unprotected state by executing steps of:
- sending a request to the server 10;
- retrieving a OTP provided to said module 6 and received in response to the sent request;
- authorizing access to the storage area 4, once said provided OTP is deemed valid.

The request contains information necessary to generate the OTP. Here, the module 6 includes a secret cryptographic key and a counter. Said counter is set up to be incremented by a predefined amount every time the module 6 sends a request to the server 10. Additionally, the module 6 may also include a timer, able to count the time elapsed since the emission of the request.

The server 10 is programmed to send the OTP upon receiving the request sent by the module 6. Here, the server 10 is also programmed to generate the OTP in response to said sent request. For example, the server 10 includes a copy of the secret cryptographic key of module 6 and a password generation module. This password generation module is programmed to generate the OTP by executing the HMAC algorithm. Then, the server 10 is programmed to send said OTP to the communication device 12.

The communication device 12 is configured to act as a security token in this authentication scheme, by being able to receive the OTP. Here, device 12 is a mobile phone.

In this example, the system also includes a data link 14 and a computing device such as a computer 16. The interface 8 is connected by a data link 14 to the computer 16. This data link 14 is chosen so as to be compatible with interface 8. Here, the data link 14 is a USB cable.

The computer 16 helps sending the request to the server 10 and providing the received OTP to the module 6.

Optionally, the system comprises a user interface 18, connected to the module 6. Here, this user interface 18 is connected to the computer 16 and thus is indirectly connected to the module 6 through interface 8. This interface 8 includes, for example, a software module programmed to:
- generate a dialog box on the computer 16 for inputting a password, and
- forward said password to the module 6.

Figure 3:
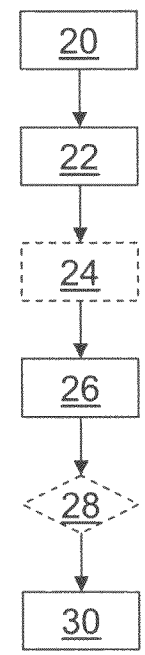
FIG. 3 is a flowchart of a method for protecting data on the mass-storage device of FIG. 2.

Operation of the device 2 will now be described, in reference to the flowchart of FIG. 3.

Initially, the storage area 4 is in the protected state. For example, the contents of said storage area 4 are encrypted, by means of known full-disk encryption techniques.

Then, access to the storage area 4 is needed, for example by the computer 16. In response, the module 6 generates a request for a one-time password. For example, said request includes a value C of the counter.

In a step 20, this generated request is sent to the remote server 10. For example, said request is forwarded by interface 8 to the computer 16. The computer 16 then forwards said request to the server 10, by means of an internet connection.

Here, the server 10 creates the OTP upon receiving said request, by computing information included in the sent request. For example, the password generation module generates the OTP, by executing the HMAC algorithm, using the value C included in said request and the secret key. Said OTP is then sent in plaintext, from the server 10 to the communication device 12. For example, the OTP is sent as a text message, using the short message service (SMS) system.

In a step 22, said one-time password is received on the communication device 12.

Optionally, in a step 24, the received OTP is displayed on the communication device 12, thus enabling a user of the device 12 to read said OTP.

Then, in a step 26, the received OTP is provided to the module 6. Here, said OTP is inputted on the user interface 18 connected to the module 6.

Optionally, during a step 28, said OTP is rejected if it is not provided to said module 6 within a pre-set amount of time since the emission of the request. For example, the module 6 counts the time elapsed since the emission of the request, until the received OTP is provided to said module 6. For example, said pre-set amount of time is equal to thirty seconds. In that case, if the received OTP is provided over thirty seconds after the request has been emitted, said OTP is rejected and cannot allow access to the storage area 4. This step provides a better level of security, for example, in case the sent OTP is stolen by an adverse third-party.

During a step 30, the module 6 authorizes access to the storage area 4, if the provided OTP is deemed valid. To determine whether the provided OTP is valid or not, the module 6 performs a validity test of the provided OTP. For example, the module 6 executes the HMAC algorithm, to compute a password verification value from the secret cryptographic key and from the value C. Then, the result of this computation is compared to said OTP. Said provided OTP is deemed valid only if it is equal to the computed password verification value. Said provided OTP is not deemed valid if it is different from said computed password verification value.

Here, the module 6 authorizes access to the storage area 4 by decrypting contents of said storage area 4.

If the provided OTP has not been deemed valid, the module 6 does not grant access to the storage area 4. The process may be restarted from step 20.

Optionally, the storage area 4 is switched back to the protected state once access to the stored data is no longer needed.

Other modes of realisation are possible.

Any of the steps 24, 26 and 28 can be omitted.

The module 6 can be configured to accept data representative of the inputted OTP, such as a cryptographic hash of said inputted OTP, instead of accepting the full inputted OTP. In that case, during the steps 28 and 30, the inputted OTP is replaced by said cryptographic hash. The validity test is then performed on the respective cryptographic hashes of the provided OTP and the computed password value.

The computer 16 can be replaced by a mobile computing device such as a mobile phone or a tablet computer.

The communication device 12 is not necessarily distinct from computer 16. For example, the device 12 can be included in computer 16.

In an other embodiment, the computer 16 can be omitted; the device 2 is then programmed to directly perform the steps 20, 22 and 28.

The OTP may be sent through e-mail instead of SMS, to an e-mail account configured to be accessed from the device 12.

For example, the data storage area 4 can be a magnetic data storage device, such as a hard-disk drive.

The data link 14 may use a communication protocol different from USB. In that case, the interface 8 is replaced by a suitable communication interface compatible with said link 14. For example, data link 14 is a wired communication protocol such as Firewire (defined by IEEE standard 1394) or Ethernet (defined by IEEE standard 802.3).

In another mode of realisation, the data link 14 is a wireless data link, comprising a plurality of radio or infra-red signals. For example, the data link 14 is a radio signal conformed to the Bluetooth communication protocol (as defined by the technical specifications published by the Bluetooth Special Interest Group). In that specific case, both the interface 8 and the computer 16 include Bluetooth-compliant radio transceivers.

The device 2 may instead be set up on-board the computer 16. In that case, the device 2 is connected to the computer 16 through internal data interfaces, such as Serial Advanced Technology Attachment (SATA) or Peripheral Component Interconnect (PCI).

Optionally, the storage area 4 is protected by means other than full disk encryption. For example, the storage area 4 is encrypted on a file-system level.

The security module 6 may include a cryptographic processor instead of a chip card.

The password-protection scheme can be implemented by an algorithm different from the "HMAC-Based One-Time Password Algorithm". For example, a time-synchronized one-time password algorithm may be used instead.

Switching the storage area 4 to the unprotected state may require providing a predefined password, in addition to the OTP, in order to implement a two-factor authentication scheme.

The invention claimed is:

1. A method for protecting data on a mass storage device, said mass storage device comprising a security module and a data storage area, wherein the method comprises:
   switching by the mass storage device the data storage area between a protected state, in which accessing the data storage area is forbidden by the security module, and an unprotected state, in which accessing the data storage area is authorized by the security module, wherein the security module comprises a secure cryptoprocessor and switching said data storage area from the protected state to the unprotected state comprises steps of:
   generating, by said security module of said mass storage device, a request for a one-time password, the request including a One Time Password (OTP) seed and not including, an OTP, in response to an access attempt to said data storage area;
   sending by the mass storage device, over a first communications network, said request for the one-time password, the request including the OTP seed, to a remote server via a computing device connected to the mass storage device;
   receiving on a mobile communication device, distinct from said mass storage device and said computing device, over a second communications network, a one-time password, generated by the remote server using the OTP seed included by the security module in the request for the one-time password, in response to the sent request including said OTP seed included in said request for the one-time password, in a text format selected from short-message service (SMS) or email;
   providing, by a user of the mobile communication device, said received one-time password to the security module using a user interface of the computing device; and
   transitioning, by the security module, the data storage area into the unprotected state, once said provided one-time password is deemed valid by said security module by comparing the provided one-time password to a password computed using said OTP seed included in said request for the one-time password.

2. The method of claim 1, further comprising rejecting said one-time password when said one-time password is not provided to the security module within a preset amount of time after the sending of the request including an OTP seed.

3. The method of claim 1, further comprising displaying said received one-time password on the communication device.

4. The method of claim 1, wherein providing said one-time password includes inputting said one-time password into a user interface of said computing device connected to the security module.

5. The method of claim 1, wherein transitioning the data storage area into the unprotected state includes decrypting contents of said data storage area.

6. The method of claim 1 wherein the communications device is a mobile computing device.

7. The method of claim 1 wherein the first communication network is the Internet and the second communication network is a short message service (SMS) system.

8. The method of claim 1 wherein the one-time password is received in an email message and the first communication network as well as the second communication network is the Internet.

9. A password-protected mass storage device, comprising:
   a security module comprising a secure cryptoprocessor and a data storage area, said mass storage device being configured to switch said data storage area between a protected state, in which accessing the data storage area is forbidden, and an unprotected state, in which accessing the data storage area is authorized, wherein said module is programmed to switch said data storage area from the protected state to the unprotected state by executing the steps of:
   generating, by said security module of said mass storage device, a request for a one-time password, the request including a One Time Password (OTP) seed and not including an OTP, in response to an access attempt to said data storage area;
   sending by the mass storage device, over a first communications network, said request for one-time password, the request including the OTP seed, to a remote server via a computing device connected to the mass storage device;

retrieving a one-time password generated by the remote server using the OTP seed, the one-time password provided to the security module on a user interface of a mobile computing device connected to the mass storage device and received, over a second communication network, by a communication device, distinct from said mass storage device and said computing device, in response to the request including said OTP seed included in said request for the one-time password in a text format selected from short-message service (SMS) or email; and transitioning, by the security module, the data storage area into the unprotected state, once said provided one-time password is deemed valid by said security module by comparing the provided one-time password to a password computed using said OTP seed.

10. The mass storage device of claim 9, wherein the security module comprises a chip card.

11. The mass storage device of claim 9 wherein the communications device is a mobile computing device.

12. The mass storage device of claim 9 wherein the first communication network is the Internet and the second communication network is a short message service (SMS) system.

13. The mass storage device of claim 9 wherein the one-time password is received in an email message and the first communication network as well as the second communication network is the Internet.

\* \* \* \* \*